United States Patent
Yen et al.

(10) Patent No.: US 10,671,986 B2
(45) Date of Patent: Jun. 2, 2020

(54) SELF-SERVICE DISTRIBUTION, COLLECTION, AND DIAGNOSTIC SYSTEM FOR MOBILE DEVICES

(71) Applicant: T-Mobile USA, Inc., Bellevue, WA (US)

(72) Inventors: Leon Chung-Dai Yen, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/690,082

(22) Filed: Aug. 29, 2017

(65) Prior Publication Data
US 2019/0066073 A1  Feb. 28, 2019

(51) Int. Cl.
| | |
|---|---|
| G06F 7/08 | (2006.01) |
| G06F 17/00 | (2019.01) |
| G06Q 20/18 | (2012.01) |
| G06Q 30/00 | (2012.01) |
| H04W 4/24 | (2018.01) |

(52) U.S. Cl.
CPC ........... G06Q 20/18 (2013.01); G06Q 30/016 (2013.01); H04W 4/24 (2013.01)

(58) Field of Classification Search
USPC ................................................. 235/375, 381
See application file for complete search history.

(56) References Cited

U.S. PATENT DOCUMENTS

| | | | |
|---|---|---|---|
| 6,490,443 B1 * | 12/2002 | Freeny, Jr. ............. | G06Q 20/32 455/406 |
| 6,536,658 B1 * | 3/2003 | Rantze ................... | G06Q 30/06 235/375 |
| 10,325,440 B2 * | 6/2019 | Abdelmalak ........ | G06Q 20/322 |
| 2004/0249711 A1 * | 12/2004 | Walker ............. | G06Q 10/06375 705/14.24 |
| 2010/0235249 A1 * | 9/2010 | Smith ................... | G06Q 20/202 705/18 |
| 2011/0141068 A1 * | 6/2011 | Dai ......................... | G09F 27/00 345/204 |
| 2011/0238296 A1 * | 9/2011 | Purks .................... | G06Q 30/00 701/533 |

(Continued)

*Primary Examiner* — Tuyen K Vo
(74) *Attorney, Agent, or Firm* — Perkins Coie LLP

(57) ABSTRACT

Systems and method are described herein for self-serve retail locations (e.g., interactive vending machines or kiosks) that are capable of handling the distribution, collection, and diagnosis of mobile devices in an on-demand manner. The self-serve retail locations may operate continuously (e.g., 24 hours a day, seven days a week). The mobile devices that are rentable and/or purchasable from the self-serve retail location may be equipped and/or activated with service plans (e.g., call, messaging, and/or data plans) offered by a local telecommunications service provider. The service plans may be pre-configured or may be customized in real-time by a user. The self-service retail locations may operate without human intervention, and may be deployed with minimal overhead at several destinations with a much smaller footprint than typical retail locations. A user may access the self-serve retail location to rent and/or purchase mobile devices as well as return previously rented and/or purchased mobile devices.

15 Claims, 9 Drawing Sheets

(56) References Cited

U.S. PATENT DOCUMENTS

| | | | |
|---|---|---|---|
| 2012/0016518 A1* | 1/2012 | Saario | G06Q 20/18 |
| | | | 700/232 |
| 2014/0089077 A1* | 3/2014 | Zuckerman | G07F 17/0064 |
| | | | 705/14.37 |
| 2014/0100942 A1* | 4/2014 | Konevic | G06Q 30/0237 |
| | | | 705/14.37 |
| 2014/0128023 A1* | 5/2014 | Guerra | G06Q 30/0645 |
| | | | 455/406 |
| 2014/0351075 A1* | 11/2014 | D'Argenio | G06Q 20/18 |
| | | | 705/26.5 |
| 2015/0032642 A1* | 1/2015 | Blackhurst | G06Q 10/20 |
| | | | 705/305 |
| 2015/0296373 A1* | 10/2015 | Morejon | H04W 8/265 |
| | | | 455/419 |
| 2016/0019741 A1* | 1/2016 | Dua | G07F 11/002 |
| | | | 700/241 |
| 2016/0024843 A1* | 1/2016 | Niemela | E06C 7/188 |
| | | | 182/129 |
| 2016/0098882 A1* | 4/2016 | Holdych | G06Q 20/327 |
| | | | 700/237 |
| 2016/0099590 A1* | 4/2016 | Velderman | H02J 7/0027 |
| | | | 320/113 |
| 2016/0314431 A1* | 10/2016 | Quezada | G06Q 10/087 |
| 2017/0148006 A1* | 5/2017 | Lowe | G06Q 10/06 |
| 2017/0256119 A1* | 9/2017 | Abdelmalak | G07F 11/38 |
| 2018/0166176 A1* | 6/2018 | Flippen | G06F 19/00 |

\* cited by examiner

SELF-SERVICE DISTRIBUTION, COLLECTION, AND DIAGNOSTIC SYSTEM FOR MOBILE DEVICES

BACKGROUND

Each year thousands, if not millions, of tourists visit international destinations. For example, more than forty million international tourists visit the United States each year. Generally, in these international destinations, either the tourist's existing telecommunications service provider does not provide service, provides minimal service (e.g., only in certain major hubs), or provides service (e.g. in partnership with another (local) telecommunications service provider) that is not cost-effective. As a result, tourists who desire voice call, messaging, and/or data service typically sign-up for short-term plans with local telecommunications service providers to save cost. However, local telecommunications service providers generally offer such services in retail locations that are located in areas that are separate and away from the point of entry (e.g., airport, train station, bus terminal, ship port, etc.) or popular tourist destinations. Even if a potential buyer can access a retail location of a telecommunications service provider, the buyer's device may not be compatible with local telecommunications service providers. Also, a retail location typically serves/covers only a specific region, and does not offer comprehensive service plans that can work in other regions. Moreover, since retail locations have set business hours and are not open 24 hours a day, seven days a week, they are unable to serve potential customers (tourists and other potential customers) outside of the retail locations' business hours.

DETAILED DESCRIPTION

Figure 1:
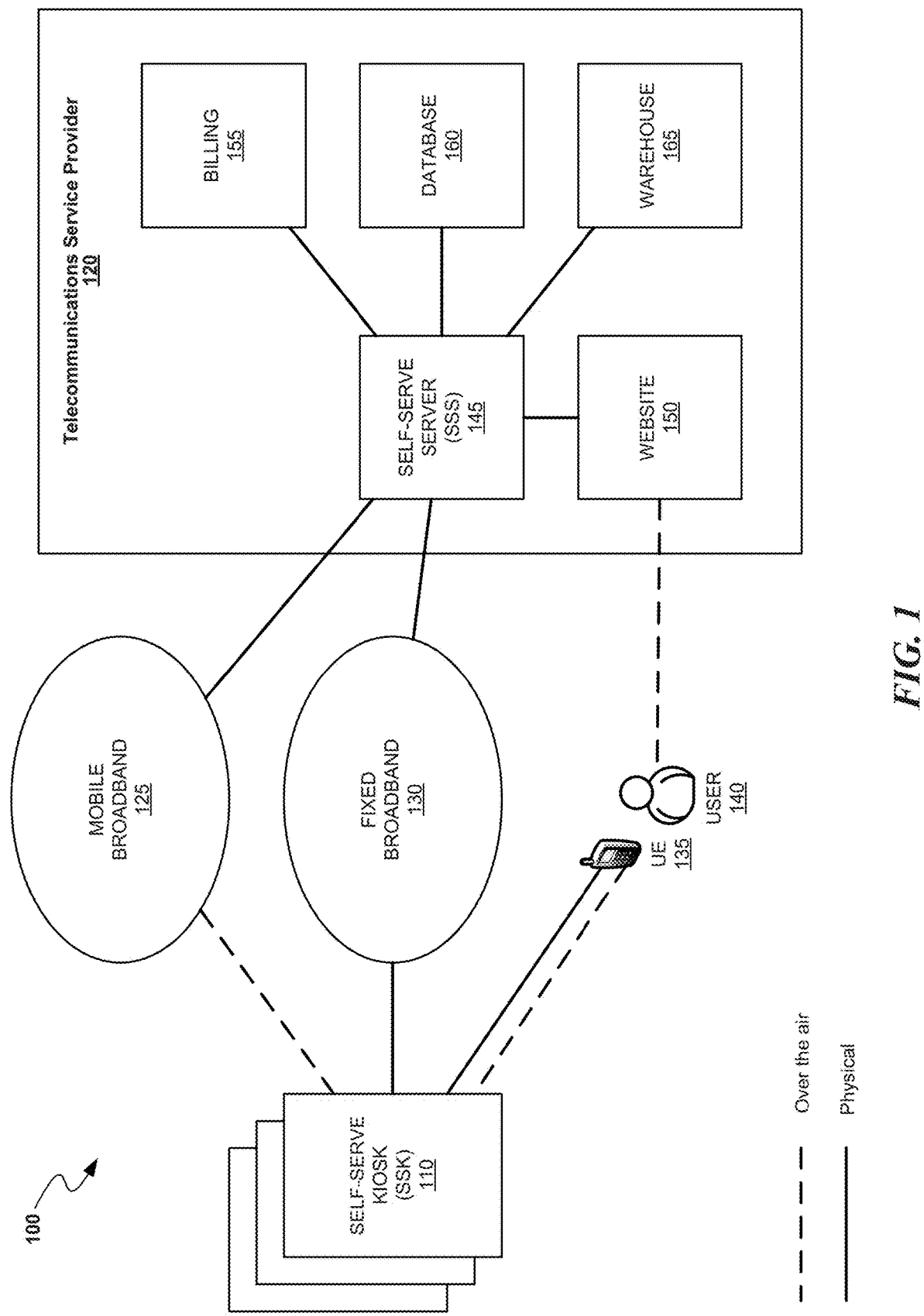
FIG. 1 illustrates aspects of a suitable network environment that facilitates self-serve retail locations.

In light of the above problems, as well as others, the inventors have recognized a need for self-serve retail locations (e.g., interactive vending machines) that are capable of handling the distribution, collection, and diagnosis of mobile devices in an on-demand manner. The self-serve retail locations can operate continuously (e.g., 24 hours a day, seven days a week). The mobile devices can be activated with service plans (e.g., voice call, messaging, and/or data plans) offered by a local telecommunications service provider. The service plans can be pre-configured or can be customized in real-time by a buyer. The self-service retail locations can operate without human intervention, and can be deployed with minimal overhead at several destinations with a much smaller footprint than typical retail locations. A buyer can access the self-serve retail location to rent and/or purchase mobile devices as well as return previously rented and/or purchased mobile devices or trade in and upgrade to new devices, all without human intervention. During the return process, the self-serve retail location can run diagnostics on the returned device for any misuse and/or damage. The returned device can then be reset to default/factory settings so that it can then be reconfigured for subsequent rental and/or purchase transactions.

Systems and method are described herein for self-serve retail locations (e.g., interactive vending machines) that are capable of handling the distribution, collection, and diagnosis of mobile devices in an on-demand manner. The self-serve retail locations may operate continuously (e.g., 24 hours a day, seven days a week). The mobile devices that are rentable and/or purchasable from the self-serve retail location may be equipped and/or activated with service plans (e.g., voice call, messaging, and/or data plans) offered by a local telecommunications service provider. The service plans may be pre-configured or may be customized in real-time by a user. The self-service retail locations may operate without human intervention, and may be deployed with minimal overhead at several destinations with a much smaller footprint than typical retail locations. A user may access the self-serve retail location to rent and/or purchase mobile devices as well as return previously rented and/or purchased mobile devices.

Existing customers of a telecommunications service provider may also access the self-serve retail locations to trade-in their mobile device for another (e.g., newer) mobile device. For example, when a new model of a mobile device is launched, an existing customer may access a self-service retail location of a telecommunications service provider (with whom the customer may or may not have a previous contractual relationship) to trade-in his/her existing device for the new device. In some cases, a customer may rent a mobile device from the self-serve retail location for a "trial" period so that he/she can test-drive a mobile device prior to making a decision to purchase and/or rent it for a longer period of time.

During the return process, the self-serve retail location may run diagnostics on the returned device for any misuse and/or damage. The returned device may then be reset to default/factory settings so that it can then be reconfigured for subsequent rental and/or purchase transactions.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment 100 within which to provide self-serve distribution, collection, and diagnostic retail locations (self-serve kiosks 110) provisioned for a telecommunications service provider 120. The self-serve kiosks 110 may be connected to a self-serve server 145 at the telecommunications service provider 120 using, for example, mobile broadband 125 and/or fixed broadband 130. The self-serve server 145 monitors and manages deployed self-serve kiosks 110, and communicates with other servers (internal and/or external), such as billing system 155, database 160, and warehouse 165.

A user 140 may also access, within proximity, the self-serve kiosks 110 using a mobile device 135. The user 140 may also access a website 150 of the telecommunications service provider 120, via a network, to perform tasks such as browse and/or search self-serve kiosks information (e.g., information related to kiosks' location, inventory, current status (active/disabled), etc.), reserve a mobile device at a kiosk, renew a previous rental transaction, schedule a service appointment at the kiosk, etc. The user 140 may provide information such as the user information (e.g., user id, mobile number, passport number (or other personal identification number), country of origin, etc.), authentication information (e.g., password, biometrics, etc.), trip information (e.g., point of arrival, point of access, etc.), rental information (e.g., duration of rental transaction, auto-renew (yes/no), expected point of return of rental, etc.), device information (e.g., device type, model, compatibility, OS version, etc.), plan information (e.g., number of call minutes, messages, and/or amount of data, etc.), and payment information (credit card number, expiry date, cvv number, bank name, issuing authority, etc.), to the website 150.

The website 150 transmits the information received from the user to the self-serve server which may access a database 160 to determine, for example, whether the user is an existing customer of the telecommunications service provider 120, past transactions performed by the user, user's track record (e.g., whether the user completes transactions in agreed-upon time, status of previously returned devices, usage frequency, etc.), health of user's account (e.g., active, inactive, disabled, probation, etc.), affiliation of the user (e.g., corporate customer, trusted customer, loyalty account details, etc.), etc.

The self-serve server 145 may also access the billing system 155 to determine, for example, the credit worthiness of the user, payment history of the user, whether the user has any outstanding unpaid invoices, etc. The self-serve 145 may also determine, based on the location of the user (e.g., point of arrival), location information of nearest self-serve kiosks available to the user. Based on the location information of the self-serve kiosks, the self-serve server 145 can access the warehouse 165 to identify the self-service kiosks that can serve the user's request. For example, if a user, who is arriving at the Seattle-Tacoma International Airport, accesses the website 150 to reserve rental of an iPhone 7 at a self-serve kiosk, the self-serve server 145 can access information in the warehouse 165 to identify a self-serve kiosk 110 located at the Seattle-Tacoma International Airport that has at least one available iPhone 7 for rent. The warehouse 165 can manage the entire inventory of mobile devices for the telecommunications service provider, or can manage inventory for a specific region (e.g., neighborhood, city, zip code, state, region (northeast, northwest, southeast, southwest, Midwest, etc.), etc.). Warehouse 165 can be a physical warehouse or a virtual warehouse. Warehouse 165 can maintain inventory of new devices, rental devices, refurbished devices, loaner devices, or any combination thereof.

FIG. 1 and the discussion herein provide a brief, general description of a suitable computing environment 100 in which the self-serve distribution, collection, and diagnostic system can be supported and implemented. Although not required, aspects of the system are described in the general context of computer-executable instructions, such as routines executed by a general-purpose computer, e.g., mobile device, a server computer, or personal computer. The self-serve server system 145 can be practiced with other communications, data processing, or computer system configurations, including: Internet appliances, hand-held devices (including tablet computers and/or personal digital assistants (PDAs)), all manner of cellular or mobile phones, multiprocessor systems, microprocessor-based or programmable consumer electronics, set-top boxes, network PCs, minicomputers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hardwired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like. Special purpose computing system environments or configurations can operate and execute specialized set of instructions to perform the particular actions associated with a configurable data stream aggregation framework.

Figure 2:
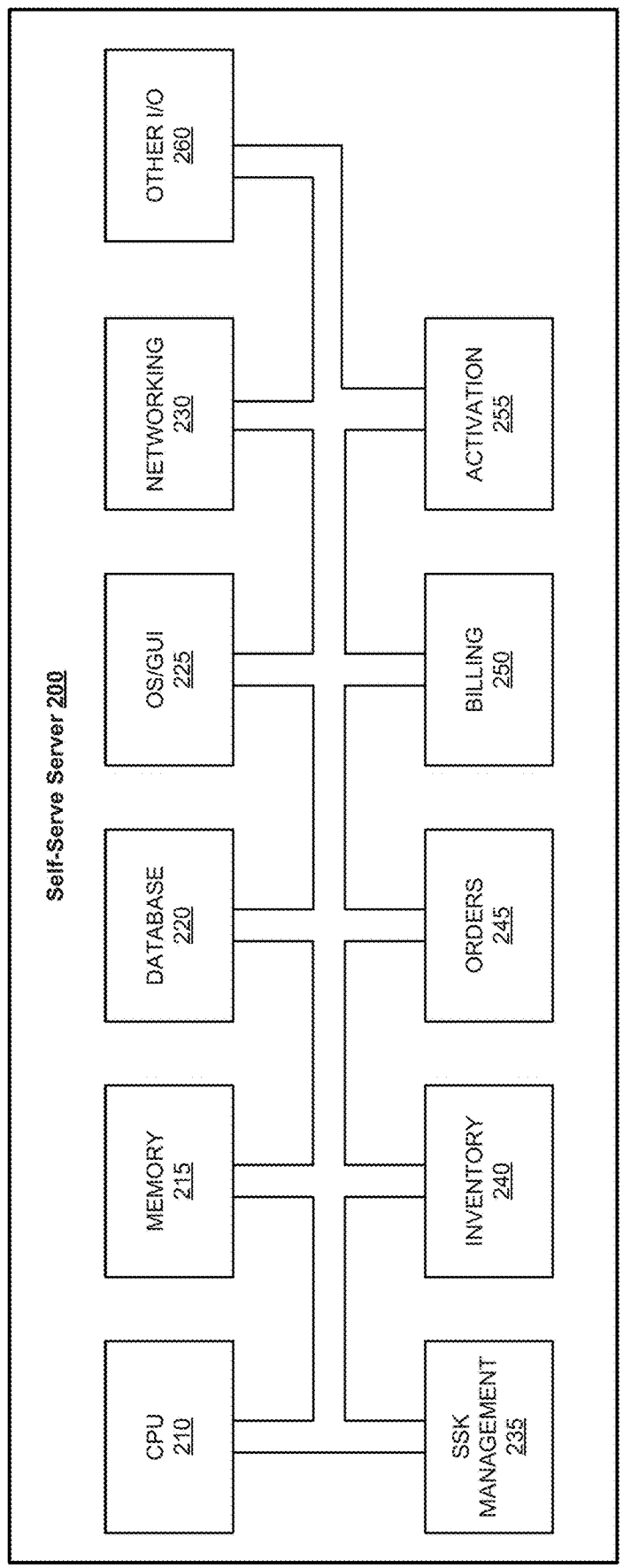
FIG. 2 illustrates logical aspects of a server that facilitates self-serve retail locations.

FIG. 2 illustrates logical aspects of a self-serve server 200 that facilitates self-serve retail locations. Self-serve server 200 can include a self-serve kiosk management module 235 that remotely manages one or more self-serve kiosks. For example, the self-serve kiosk management module may determine the following information about the self-serve kiosks: current status, system information, hardware/software versions, physical locations, IP addresses, error codes (if necessary), etc. The self-serve kiosk management module may (e.g., by utilizing TR-069 standards) remotely reboot one or more self-serve kiosks, request software update, upload self-serve kiosk error logs, etc. for maintenance and/or troubleshooting purposes. In some embodiments, self-serve kiosks may send periodic status updates to the self-serve server 200. Information in the period status updates may include, but is not limited to, hardware version, software version, health status of key components (e.g., scanner), IP address, last reboot time, last update time, inventory level (or inventory list), transaction history, charging bay utilization, # of clients (served by the embedded femtocell), IMS registration, error code, etc.

In some embodiments, the self-serve kiosk management module may provide input to the CPU (processor) 210, notifying it of actions. The actions are typically mediated by a hardware controller that interprets source code changes received from the self-serve kiosk management module 235 and communicates the information to the CPU 210 using a communication protocol. Examples of actions include, but are not limited to, verifying self-serve kiosk transaction, verifying a user, refilling a device, confirming a refill, self-serve kiosks management (e.g., to determine current status, location, etc. of self-serve kiosks), etc.

CPU 210 can be a single processing unit or multiple processing units in a device or distributed across multiple devices. CPU 210 can be coupled to other hardware devices, for example, with the use of a bus, such as a PCI bus or SCSI bus. The CPU 210 can communicate with a hardware controller for devices, such as for a OS/GUI 225. OS/GUI 225 can be used to display text and graphics. In some examples, OS/GUI 225 provides graphical and textual visual feedback to a user, such as an administrator. The OS/GUI 225 can provide information related to order management, inventory management, billing, self-serve kiosks status, etc. The OS/GUI 225 can provide information using, for example, an LCD display screen, an LED display screen, and so on. Other I/O devices 260 may also be coupled to the processor, such as a network card, video card, audio card, USB, firewire or other external device, camera, printer, speakers, CD-ROM drive, DVD drive, disk drive, or Blu-Ray device.

In some implementations, the self-serve server 200 also includes a communication device capable of communicating wirelessly or wire-based with a network node. The communication device can communicate with another device or a server through a network using, for example, TCP/IP protocols. Self-serve server 200 can utilize the communication device to distribute operations across multiple network devices.

The CPU 210 may have access to a memory 215. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; rather a memory is non-transitory. Memory 215 can include program memory that stores programs and software, such as an operating system and application programs. Memory 215 can also include data memory that can include user data such as passwords, usernames, input text, audio, video, user preferences, and selections. Data memory can also include configuration data, settings, user options, etc. Data in memory can be provided to the program memory or any element of the device 200.

The CPU 210 may have access to a database 220 that stores data, such as user data (user identifier, username, authentication information, etc.). The self-serve server 200 may access database 160 to determine, for example, whether the user is an existing customer of the telecommunications service provider 120, past transactions performed by the user, user's track record (e.g., whether the user completes transactions in agreed-upon time, status of previously returned devices, usage frequency, etc.), health of user's account (e.g., active, inactive, disabled, probation, etc.), affiliation of the user (e.g., corporate customer, trusted customer, loyalty account details, etc.), etc.

The self-serve server 200 may include an inventory module 240. The inventory module 240 manages the inventory of devices for rent and/or purchase. It may have access to database 220 that stores information related to device inventory, such as, model type, model year, number of units available, number of units rented, number of units purchased, expected date(s) of return, etc. For example, when a user accesses the website 150 (FIG. 1) to search/browse devices available for rent/purchase, the inventory module 240 at the self-serve server 200 may receive and process the search/browse request to determine the availability of devices at a self-serve kiosk. The self-serve server 200 can include an orders module 245 that manages rental and/or purchase orders for the devices. For example, when a user places an order (rental/purchase) for a device via the website 150 (FIG. 1), the orders module 245 may receive and process the order by reserving (and allocating) the device for the user. The orders module 245 may have access to a billing module 250 that processes payment related information for an order. For example, the billing module 250 may receive payment information, such as name on credit card, credit card issuing authority, credit card number, expiration date, etc., for an order placed by a user using the website 150 (FIG. 1). The billing module 250 may process the payment information and charge the user's account for the rental/purchase order.

An activation module 255 in the self-serve server 200 manages the activation of a device and its associated SIM card. The activation module 255 may determine the plan information selected by the user and activate the SIM card associated with the selected device accordingly. Self-serve server 200 also comprises a networking module 230 that enable the self-serve server 200 to communicate with remote servers, self-serve kiosks, a telecommunications service provider network, or other portable electronic devices by transmitting and receiving wireless signals using a licensed, semi-licensed, or unlicensed spectrum over communications network (e.g., cable, fiber, mobile (LTE) broadband, etc.). In some cases, the communication network may be comprised of multiple networks, even multiple heterogeneous networks, such as one or more border networks, voice networks, broadband networks, service provider networks, or other communications network.

Figure 3:
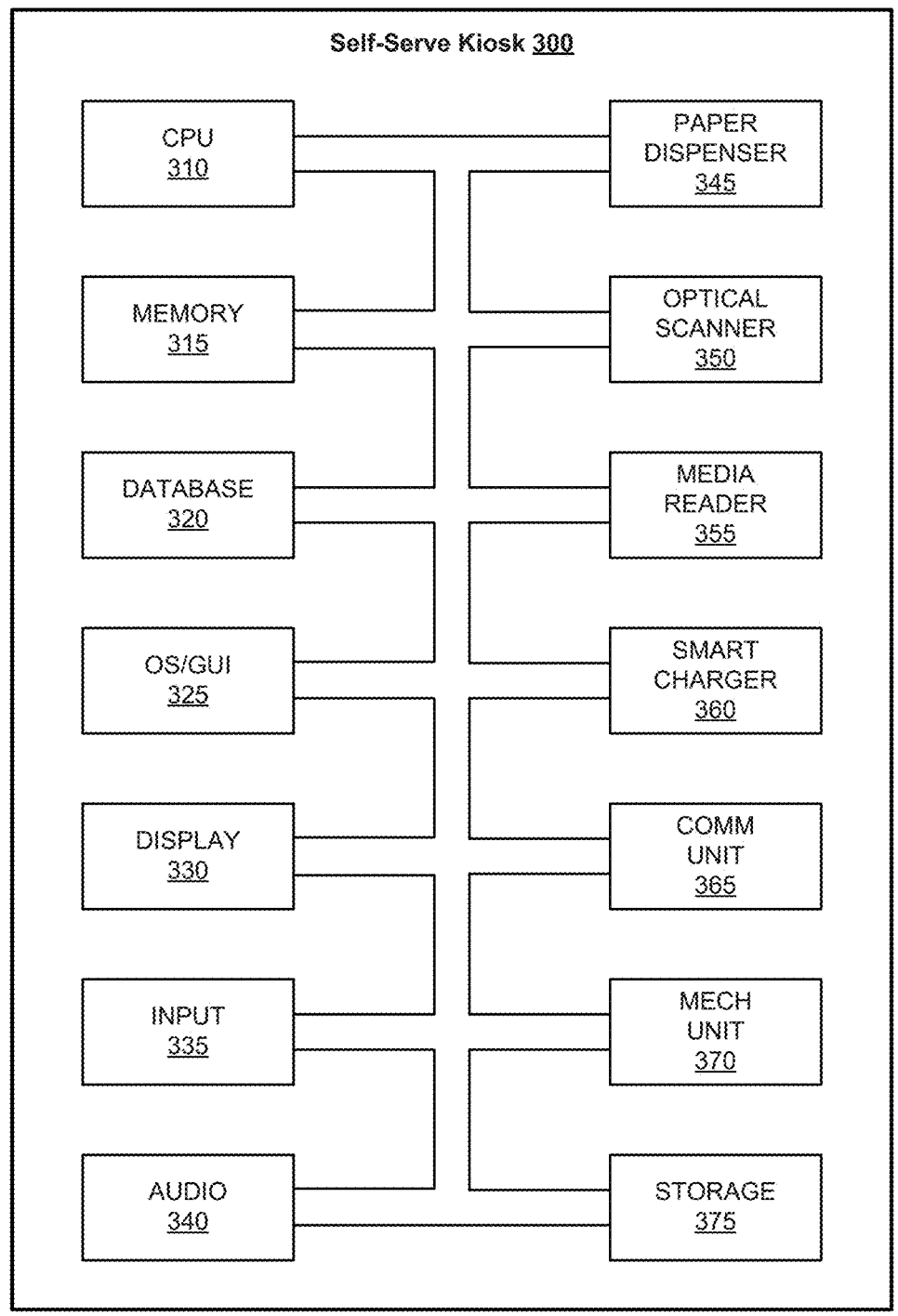
FIG. 3 illustrates logical aspects of a kiosk that facilitates self-serve retail locations.

FIG. 3 illustrates logical aspects of a self-serve kiosk 300 that facilitates distribution, collection, and diagnosis of mobile devices. Self-serve kiosk 300 can include one or more input devices 335 that provide input to the CPU (processor) 310, notifying it of actions. The actions are typically mediated by a hardware controller that interprets user actions received from the input device and communicates the information to the CPU 310 using a communication protocol. Input devices 335 include, for example, a keyboard, a touchscreen, haptic devices, audio/visual input devices, QR code scanner, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. For example, CPU 310 can be coupled to a OS/GUI 325. The OS/GUI may be used by administrators to configure, troubleshoot, and/or update the self-serve kiosk. CPU 310 can also communicate with a hardware controller for devices, such as for a display 330. Display 330 can be used to display text and graphics to a user of the self-serve kiosk. In some examples, display 330 provides graphical and textual visual feedback to a user. For example, display 330 may be used for displaying instructions, advertisements, etc. to a user. The display 330 may provide information related to device inventory, device availability, payment information, order information, account information, etc. The display 330 may also enable a user to view a rental/purchase contract and its associated terms (e.g., rental duration, rental charge, liabilities, etc.). A user may review the rental contract and provide an indication of agreement/disagreement using input 335. Examples of display devices are an LCD display screen, an LED display screen, and so on. Other I/O devices can also be coupled to the processor, such as a network card, video card, audio module 340 (e.g., audio card, speakers, mic, to provide instructions and/or advertisements, etc.), USB, firewire or other external device, camera, printer, paper dispenser 345 (e.g., to print purchase invoice or rental/return receipts), CD-ROM drive, DVD drive, disk drive, optical scanner 350 (e.g., for device scanning, QR code reader, etc.), media reader 355 (e.g., for credit card payment, user identifier card recognition (e.g., passport scanner)), biometric sensor, etc.

CPU 310 can have access to a memory 315. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; rather a memory is non-transitory. Memory 315 can include program memory that stores programs and software, such as an operating system and other application programs. Memory 315 can also include data memory that can include kiosk data such as location, inventory, last update date/version, etc. Data memory can also include configuration data, settings, user options, time stamps, or session identifiers. Data in memory can be provided to the program memory or any element of the self-serve kiosk 300. CPU 310 may have access to a database 320 that stores information related to device inventory, such as model type, model year, number of units available, number of units rented, number of units purchased, expected date(s) of return, accessories data, etc. Other information such as SSK status, upcoming reservations, transaction history, error logs, etc. could also be temporarily stored in database 320. Device and/or accessories information may be displayed at the display 330.

One or more smart chargers 360 can also be coupled to the processor. A smart charger may be used to charge, analyze, and reset mobile devices that are available for rent at the self-serve kiosk 300. Examples of suitable smart chargers 360 include any of those disclosed in U.S. application Ser. No. 14/542,330, filed Nov. 14, 2014, and U.S. application Ser. No. 14/976,068, filed Dec. 21, 2015, both of which are incorporated by reference herein in their entirety.

In some implementations, the self-serve kiosk 300 also includes a communication unit 365 capable of communicating wirelessly or wire-based with a network node (e.g., self-serve server 200, FIG. 2). The communication unit 365 can communicate with another SSK 300 or a server through a network using, for example, mobile/fixed broadband connectivities utilizing TCP/IP protocols. Self-serve kiosk 300 can utilize the communication unit 365 to distribute operations across multiple network devices. Self-serve kiosk 300 can also identify device owner (renter) and then pre-fetch his/her information from Telecommunications Service Provider 120 via Self-serve server 145 onto Self-serve kiosk 300 when the purchased (rented) device is within the proximity of the Self-serve kiosk 300. Self-serve kiosk 300 can comprise a mechanical unit 370 such as a robotic arm or movable picker that manages the dispensing and collection of mobile devices. For example, when a user selects a mobile device for rent/purchase, the mechanical unit 370 can facilitate the dispensing of the selected device from the appropriate device bay (e.g., slot) to a delivery area (e.g., dispensing bay). The self-serve kiosk 300 may include a storage unit 375 that provides physical space/compartments to store devices and accessories, possibly with charging capabilities so that devices remain charged while in the kiosk and before being dispensed to a valid user.

Figure 4:
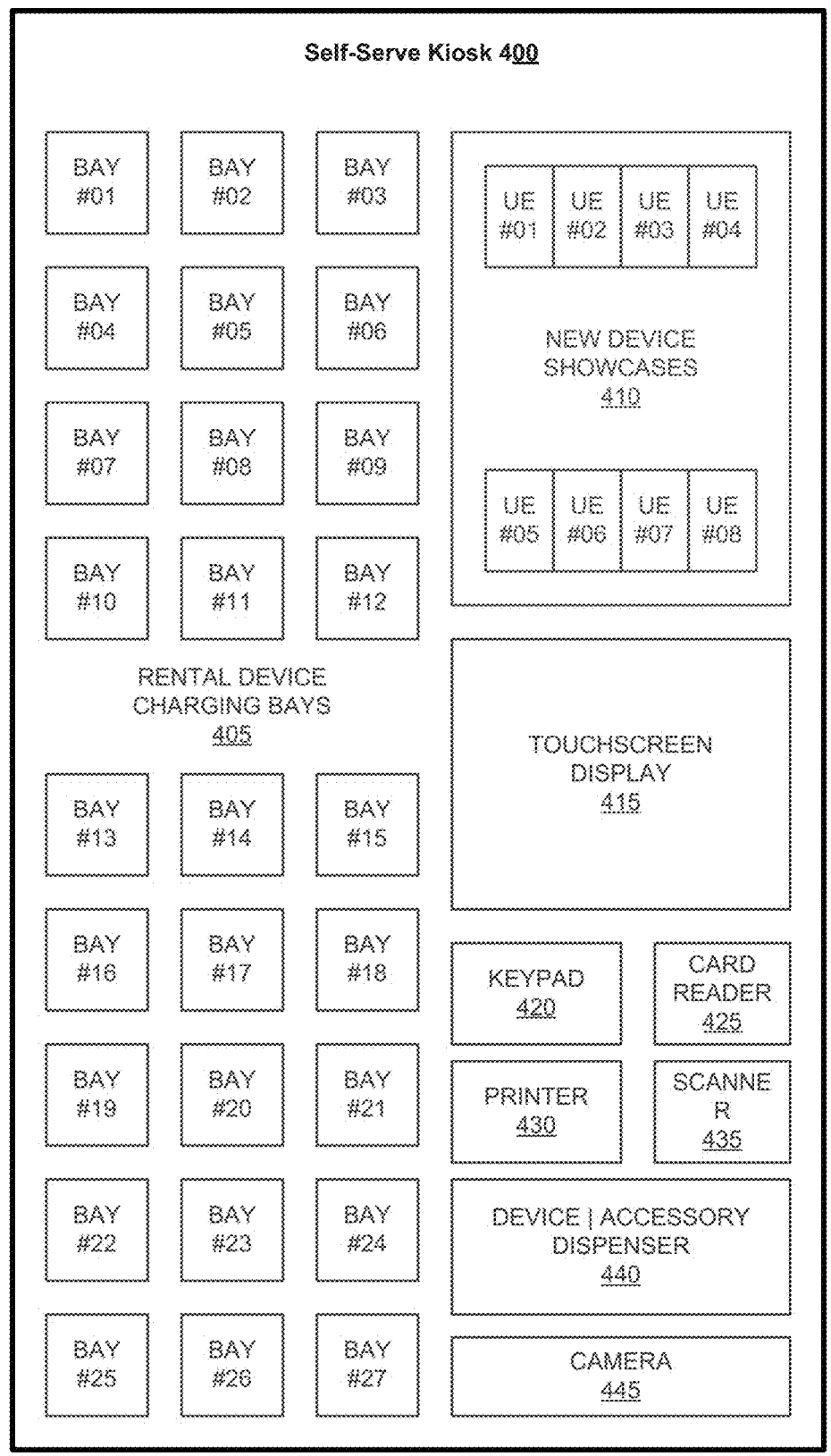
FIG. 4 illustrates physical aspects of a kiosk that facilitates self-serve retail locations.

FIG. 4 illustrates physical aspects of a kiosk 400 that facilitates self-serve retail locations. Self-serve kiosk 400 may comprise one or more rental device charging bays 405 (Bay #01, Bay #02, . . . Bay #27). Each bay in the rental device charging bays 405 may be enclosed by a see-through windowed door to display mobile devices that are available for rent from the self-serve kiosk. Each bay may also display information about the device (e.g., model number, manufacturer, model year, recommended accessories, etc.) as well as information about the telecommunications service provider plan (e.g., call, text, and/or data) associated with mobile device (e.g., associated with the SIM in the mobile device). Each bay in the rental device charging bays 405 may be automatically locked/unlocked by the self-serve kiosk. In some embodiments, some rental devices in the rental device charging bays 405 may be activated prior to their dispensing by the self-serve kiosk. For example, once a user selects a mobile device from one of the rental device charging bays 405, the self-serve kiosk may handle activation of the mobile device (and associated SIM) prior to its dispensing. In some embodiments, mobile devices may be pre-activated prior to their placement in the rental device charging bays 405. Mobile devices in the rental device charging bays may be connected to a smart charger to ensure that the device remains charged. A device may be picked up by disconnecting it from the smart charger (e.g., by disconnecting the device from the USB cable within its charging bay or removing it from its wireless charging/communications pad). The return bay location may be predetermined or may be chosen by the user when he/she returns the device to the self-serve kiosk. In some embodiments, a user may return a device by connecting it to a smart charger in an empty rental device charging bay (e.g., by connecting the device to the USB cable within a charging bay).

Self-serve kiosk 400 may also comprise a section for new device showcase 410 (UE #01, UE #02, . . . UE #08). Each bay in the new device showcase 410 may display new mobile devices in their original retail packaging. For example, the new device showcase 410 may display the latest models of mobile devices available from one or more device manufacturers. Devices in the new device showcase 410 may be available for rent and/or purchase. New device showcase 410 may display advertisements for upcoming device releases, including displaying their expected launch date, etc. Users may interact with the new device showcase to explore new devices, their features, pricing plans, etc.

Users may be able to access the self-serve kiosk 400 via a touchscreen display 415. Touchscreen display 415 can be used to display text and graphics. In some examples, touchscreen display 415 provides graphical and textual visual feedback to a user. Users can browse and/or search for devices available for rent and/or purchase using the touchscreen display 415 and keypad 420. The touchscreen display 415 can provide information related to device inventory, device availability, payment information, order information, account information, etc.

A user can access a previously reserved mobile device (e.g., reserved via the website 150, FIG. 1) by scanning a QR code (or another unique identifier such as from an RFID chip) via a QR code scanner 435. The QR code scanner can process the scanned QR code so that the self-serve kiosk 400 can retrieve information related to the reservation (e.g., reservation id, reservation date, reserved mobile device, type of transaction (e.g., rental, purchase, trade-in, test-drive, etc.), duration of transaction (if relevant), etc. The touchscreen display 415 may also enable a user to view a rental/purchase contract and its associated terms (e.g., rental duration, rental charge, liabilities, etc.). A user may review the rental contract and provide an indication of agreement/ disagreement using keypad 420 and/or using touchscreen display 415. Examples of touchscreen display devices are an LCD screen, an LED screen, and so on. A user can also select one or more accessories for rent/purchase. The selected mobile device(s) and/or accessories are dispensed via the device/accessories dispenser 440. Rental mobile device(s) are ready to be retrieved once its associated rental device charging bay 405 is unlocked.

A user can pay for the rent/purchase transaction (mobile devices and/or accessories) using the card reader 425 that enables the scanning and processing of a credit/debit card for payment purposes. In some embodiments, a user can pre-pay for the rent/purchase transaction using, for example, his/her mobile device (e.g., at the time of/after making the reservation using website 150, FIG. 1). Card reader 425 may also be used to read user identification data (e.g., passport using passport scanner). Printer 430 will print out rental agreement, return confirmation, and/or purchase invoice when user desires to do so. At least one digital video camera 445 is equipped with each self-serve kiosk 400 for surveillance and/or real-time customer services.

Figure 5:
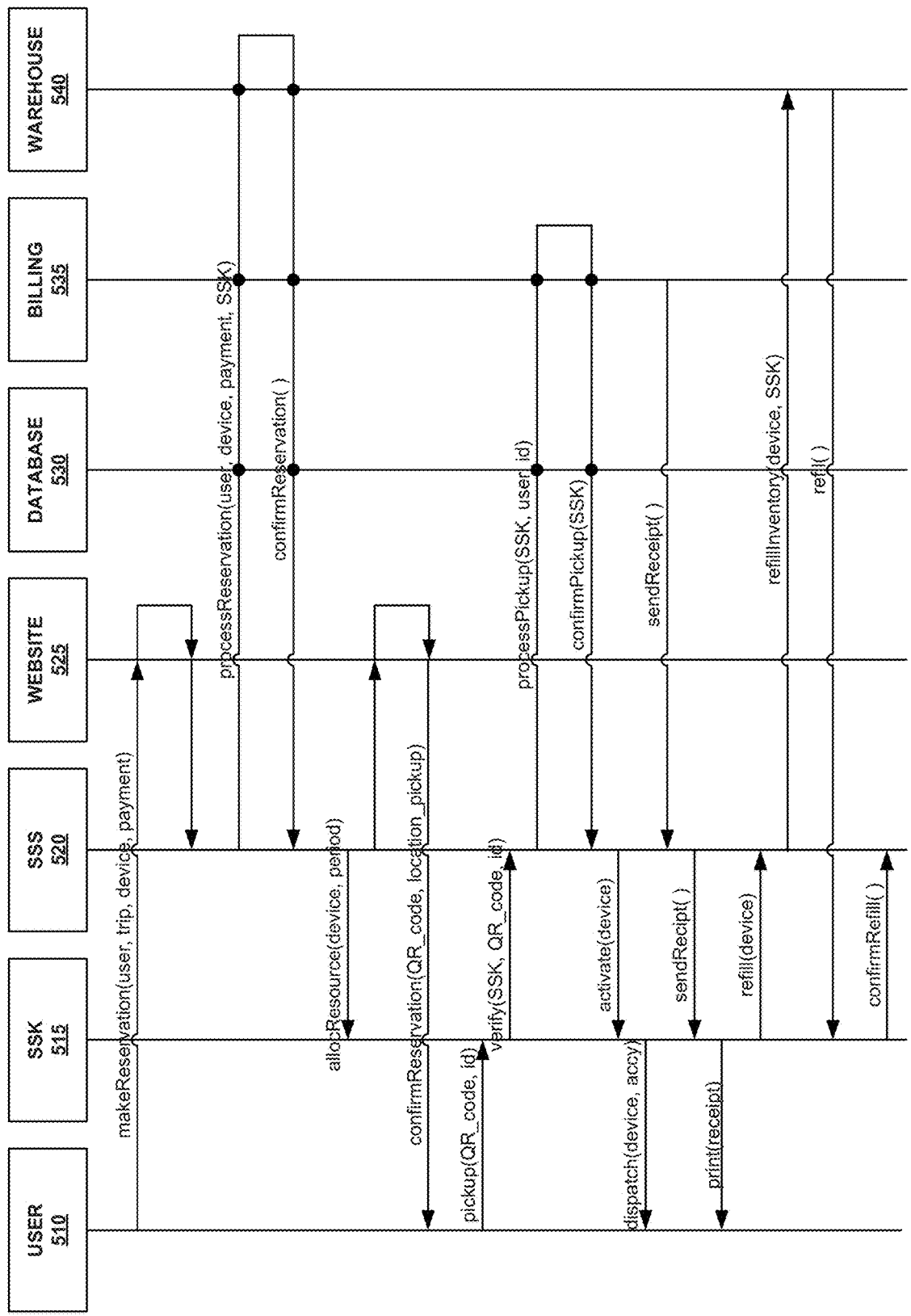
FIG. 5 is a flow diagram illustrating a method of handling forward logistics in self-serve retail locations.

FIG. 5 is a flow diagram illustrating a method of handling forward logistics in self-serve retail locations. A user 510 may access a website 525 to make a reservation with the self-serve system. The reservation may be one of the following: rental, purchase, trade-in, test-drive, etc. The user 510 may provide information such as the user information, authentication information, trip information, rental information, device selection, plan selection, and payment information, as discussed above, to the website 525.

The website 525 transmits the information received from the user to a self-serve server 520 which may access a database 530 to process the reservation. For example, the self-serve server 520 may access the database 530 to determine, for example, whether the user is an existing customer of a telecommunications service provider, past transactions performed by the user, user's track record (e.g., whether the user completes transactions in agreed-upon time, status of previously returned devices, usage frequency, etc.), health of user's account (e.g., active, inactive, disabled, probation, etc.), affiliation of the user (e.g., corporate customer, trusted customer, loyalty account details, etc.), etc.

The self-serve server 520 may also access the billing system 535 to determine, for example, the credit worthiness of the user, payment history of the user, whether the user has any outstanding unpaid invoices, etc. The self-serve 520 may also determine, based on the location of the user (e.g., point of arrival), location information of nearest self-serve kiosks available to the user. Based on the location information of the self-serve kiosks, the self-serve server 520 may access the warehouse 540 to identify one or more self-service kiosks that can fulfil the user's request. For example, if a user, who is arriving at the Seattle-Tacoma International Airport, accesses the website 525 to reserve a rental of an iPhone 7 at a self-serve kiosk, the self-serve server 520 can access information in the warehouse 540 to identify a self-serve kiosk located at the Seattle-Tacoma International Airport and a self-serve kiosk located at the Pike Place Market, each of which has at least one available iPhone 7 for rent.

Once the self-serve server 520 receives one or more messages confirming the reservation from the database 530, billing system 535, and/or warehouse 540, it may select a self-serve kiosk 515 that will fulfil the request. For example, if the warehouse 540 identifies more than one self-serve kiosk that can fulfil the user's reservation request, the self-serve server may select one of the identified self-serve kiosks based on certain criteria related to the kiosk (e.g., popularity, location, points of interest in the vicinity, accessibility, inventory, etc.). In some implementations, the self-serve server selects more than one candidate self-serve kiosks to present to the user (allowing the user to select a particular self-serve kiosk from the set of candidate self-serve kiosks).

Upon selecting one or more self-serve kiosks that can fulfil the request, the self-serve server 520 may allocate the identified device at the identified self-serve kiosk(s) 515. The device may be allocated for a period of time that may be pre-determined, or determined dynamically (e.g., based on inventory at kiosk, popularity of device, popularity of kiosk, etc.). For example, a device may be allocated for a first time period (e.g., 1 day) at a first identified kiosk and for a second time period (e.g., 6 hours) at a second identified kiosk, based on the one or more factors discussed above. After allocating the device at the self-serve kiosk(s) 515, the self-serve server 520 transmits a confirmation message to the website which then transmits a confirm reservation message to the customer. The confirm reservation message comprises one or more of the following: a unique identification code (e.g., QR code, personal identification number, password, barcode, etc.), location(s) of identified kiosk(s), time period of reservation, etc.

The user 510 may then arrive at one of the identified self-serve kiosks to pick up the reserved device. The user presents their unique identification code to the self-serve kiosk. The user may also present identification information and/or artifact such as a driving license, passport, credit card, or any other identification documents to the self-serve kiosk. The self-serve kiosk 515 then verifies the information provided by the user with the self-serve server 520. For example, the self-serve kiosk 515 transmits a verification message to the self-serve server 520. The verification message may comprise of the following information: self-serve kiosk identification information, the unique identification code provided by the user, user identification information, etc. Once the user transaction is verified, the self-serve server 520 processes the pick-up. For example, the self-serve server 520 may contact the database 530 to update user information to indicate that the identified user is completing a transaction. The self-serve server 520 may contact the billing system 535 to verify payment for the transaction, charge the user's account for the transaction amount, etc.

Once the server confirms the pick-up at the self-serve kiosk, it informs the self-serve kiosk to activate the device and/or the SIM. For example, for a rental transaction, the SIM card associated with the device may be activated with the selected plan information. For a new device purchase transaction, the self-serve kiosk may activate both the new device and the associated SIM. The IMEI information associated with the new device/SIM may be updated in the database 530. Once the device and/or SIM is activated, the self-serve kiosk 515 may dispense the device to the user 510. For example, the activated device may be delivered to a delivery bay at the self-serve kiosk for pick-up. In some embodiments, the self-serve kiosk may unlock a device bay and allow the user to pick up the device. The self-serve kiosk may also dispense one or more accessories (e.g., charger, headphones, case, etc.) with the device. The billing system 535 may send a receipt to the self-serve server 520 which is transmitted to the self-serve kiosk for printing and delivery to the user 510. The user may also review the terms and conditions of the transaction and confirm their agreement. The terms and conditions may be presented at the website when the user makes the reservation, and/or may be presented at the self-serve kiosk when the user picks up the reserved device.

The self-serve kiosk 515 regularly checks its inventory of devices. When it determines that its inventory of certain devices is lower than a threshold amount (predetermined, or determined dynamically based on popularity of devices, popularity of kiosk, expected market events such as launch of a new device, etc.), the self-serve kiosk 515 may send a refill device message to the self-serve server 520. The self-serve server 520 then sends a refill inventory message to the warehouse 540 informing it of the self-serve kiosk and its associated refill request. The warehouse 540 may determine the amount of inventory of each device to refill and refill the inventory of the self-serve kiosk 515. Once the inventory of the self-serve kiosk 515 is updated, it confirms the refill to the self-serve server 520.

In some embodiments, the self-serve kiosk 515 periodically monitor its inventory of devices to perform one or more actions and/or transmit it to the self-serve server 520. For example, based on the inventory of a device (or a device type, etc.), the self-serve kiosk 515 or the self-serve server 520 may determine a discount amount to offer for the device (e.g., to stimulate sales). Self-serve kiosk 515 may inform the self-serve server 520 of transactions during a certain time period (e.g., day, week, month, etc.) to help the self-serve server 520 analyze user purchasing habits and trends for inventory management. This information may be used to update the inventory of the self-serve kiosk 515 (e.g., by increasing the inventory of more popular devices, and decreasing the inventory of less popular devices).

Figure 6:
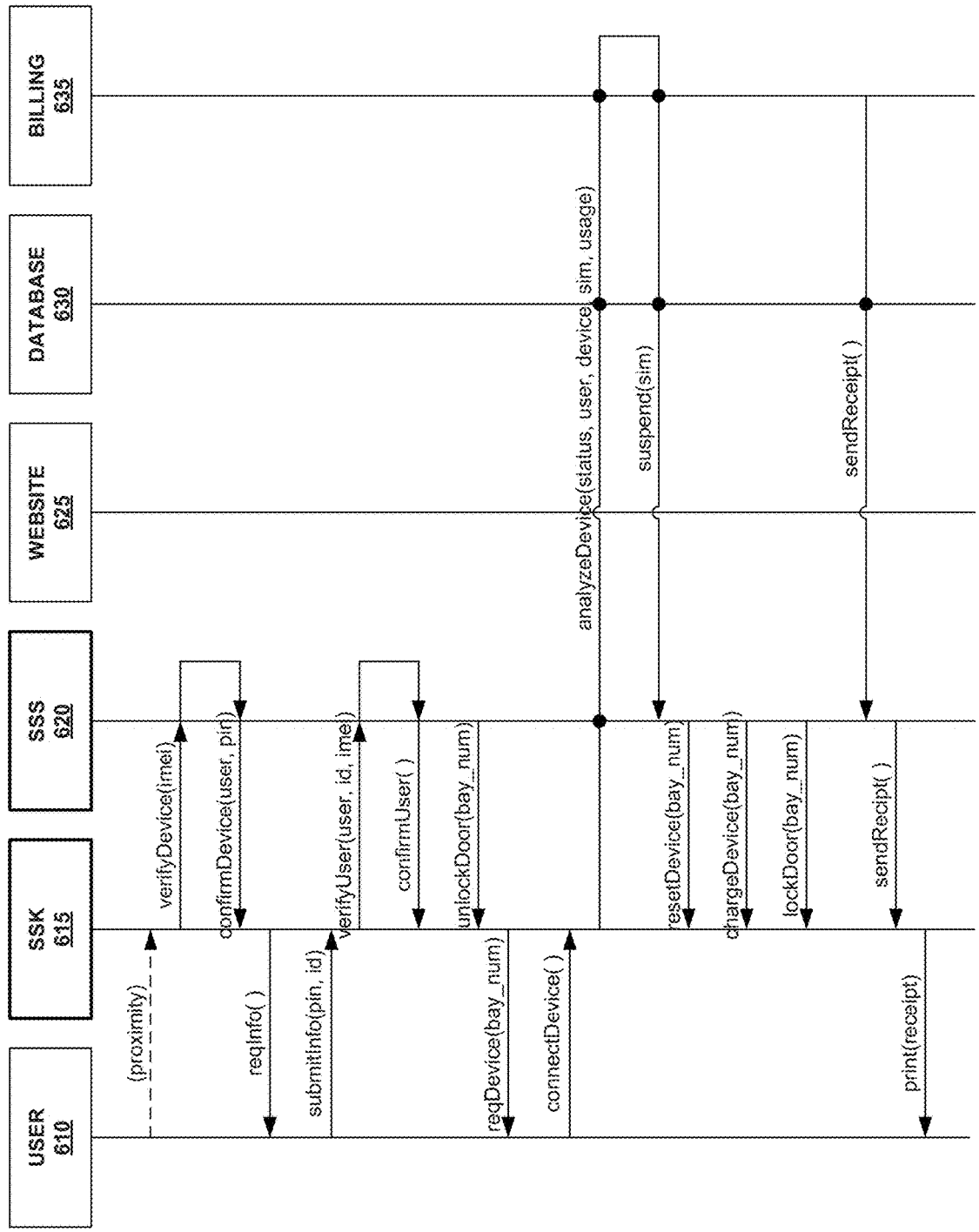
FIG. 6 is a flow diagram illustrating a method of handling reverse logistics in self-serve retail locations.

FIG. 6 is a flow diagram illustrating a method of handling reverse (return) logistics in self-serve retail locations. When a user 610 is in the proximity of a self-serve kiosk 615 to return a previously procured (e.g. rented) device, the self-serve kiosk 615 may verify the device with the self-serve server 620 based upon the IMEI number of the device. Other unique identifiers for the device, such as device name, ESN, serial number, etc., may be used. The self-serve server 620 may confirm the device by matching its unique identifier with stored information. For example, the self-serve server 620 may query the database 630 with the unique device identifier to determine which user has previously made transactions involving the device. The self-serve server 620 may identify a user that made the most recent transaction involving the device (e.g., the last user that rented the device), and determine the user's identification information (e.g., user identifier, password, pin, etc.). Once the self-serve server 620 verifies the device, it sends a confirm device message, along with the user's identification information, to the self-serve kiosk 615 for verification. The self-serve kiosk 615 may request the user for identification information so that it can verify that the user returning the device is authorized to do so.

Once the user 610 provides the requested information (e.g., user identifier, password, pin, etc.), the self-serve kiosk may verify the information by matching it with the information received from the self-serve server. In some embodiments, the self-serve kiosk may transmit the user requested information and the device identifier to the self-serve server so that the self-serve server can verify and authenticate the user's return transaction. After the self-serve server 620 verifies the user and the return transaction, it transmits a confirm user message to the self-serve kiosk. The confirm user message informs the self-serve kiosk 615 that the user is authorized to complete the return transaction. The self-serve kiosk 615 may then identify a bay in the self-serve kiosk that is empty and available to receive the returned device. For example, bays in the self-serve kiosks may contain device specific smart chargers (e.g. devices with different OS), or may contain universal self-chargers. In some embodiments, based on the type of returned device, the self-serve kiosk identifies the appropriate bay that is available to process the return transaction. The self-serve kiosk 615 informs the user of the appropriate bay to return the device (e.g., by displaying the bay number in a display window or by providing other visual, audio, etc. indicators) and unlocks the identified bay.

The user 610 may connect the returned device, via a USB cable, to the smart charger in an identified charging bay on the self-serve kiosk 615. The self-serve kiosk 615 analyzes the returned device and performs device diagnostics. For example, the smart charger in the self-serve 615 may perform device diagnostics and transmit the device information to the self-serve server 620. Such diagnostics can include: accessing status logs on the device regarding usage and performance of the device; performing processor and memory diagnostics to ensure those chips are functioning properly; various cellular, WiFi, Bluetooth and GPS radio diagnostics to ensure those circuits are operating properly; and performing an automated visual inspection of the outside condition of the device and any damage to the device's touchscreen. The self-serve server may access the database 630 and the billing system 635 to verify device usage, SIM usage, condition of device, transactions performed by the user using device, etc. Once the information is verified, the self-serve server 620 may suspend (e.g., deactivate) the SIM associated with the returned device. The returned device may then be reset to factory default settings (or other default settings). The self-serve kiosk 615 may then charge the device for future transactions and lock the door of the bay in which the device was returned. The billing system and/or the database may generate a receipt for the transaction based on usage data and transmit it to the self-serve kiosk via the self-serve server. The self-serve kiosk may then print the return transaction receipt and deliver it to the user. In some embodiments, the user may receive an electronic receipt, for example, via the website 625, email, app, etc.

Figure 7:
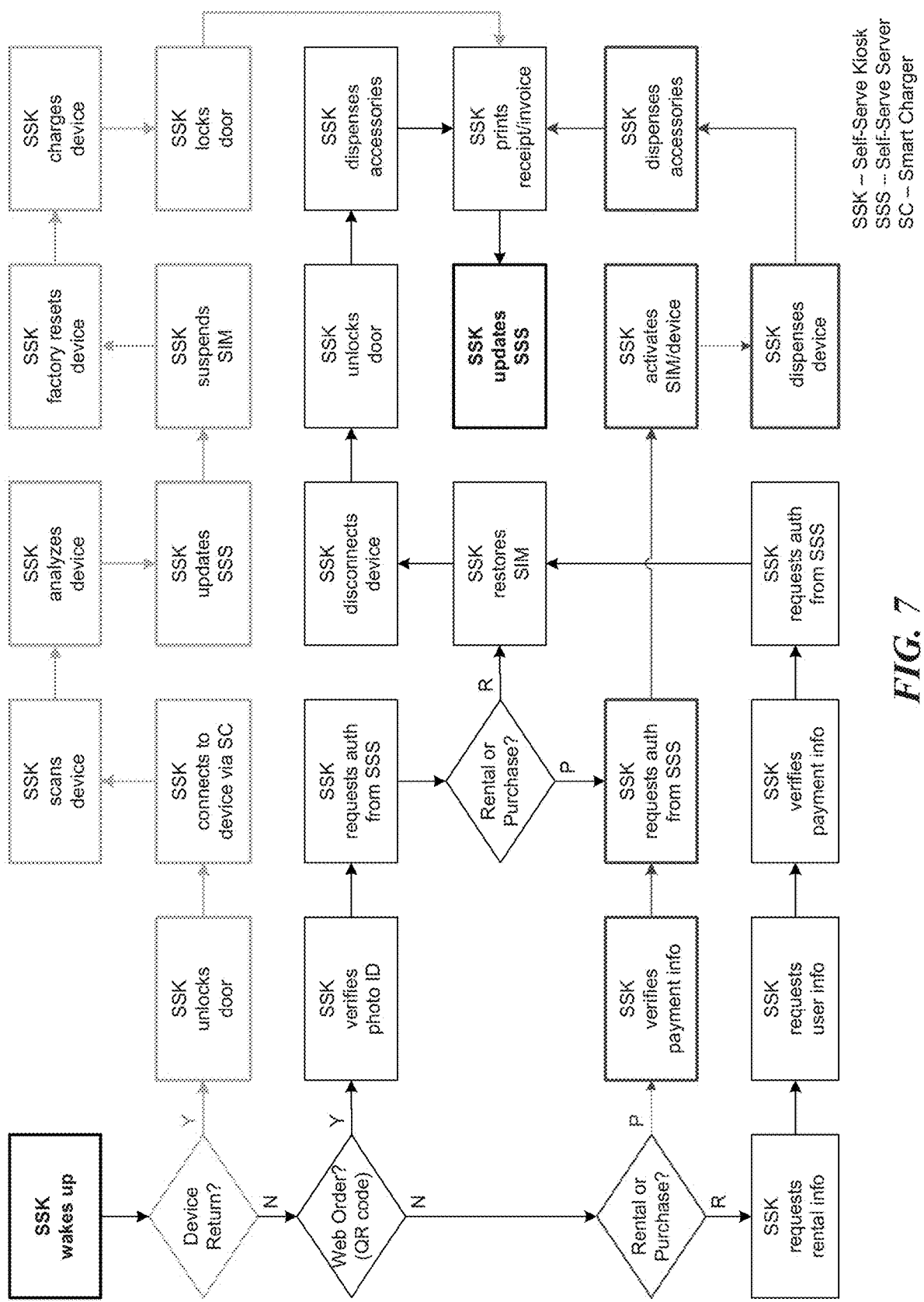
FIG. 7 is a flow diagram illustrating a method of handling a transaction at a kiosk.
Figure 8:
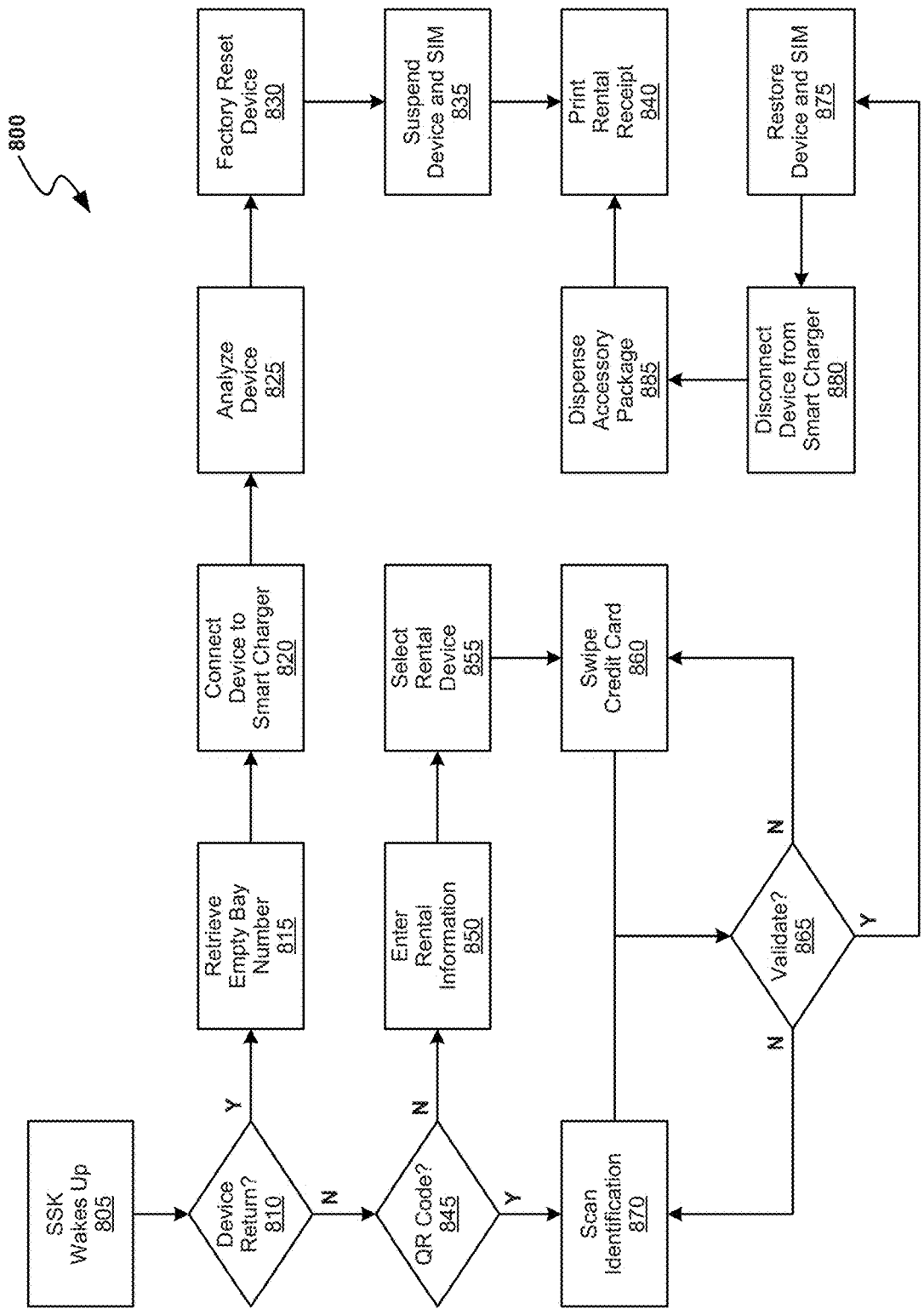
FIG. 8 is a flow diagram illustrating a method of handling a rental transaction at a kiosk.
Figure 9:
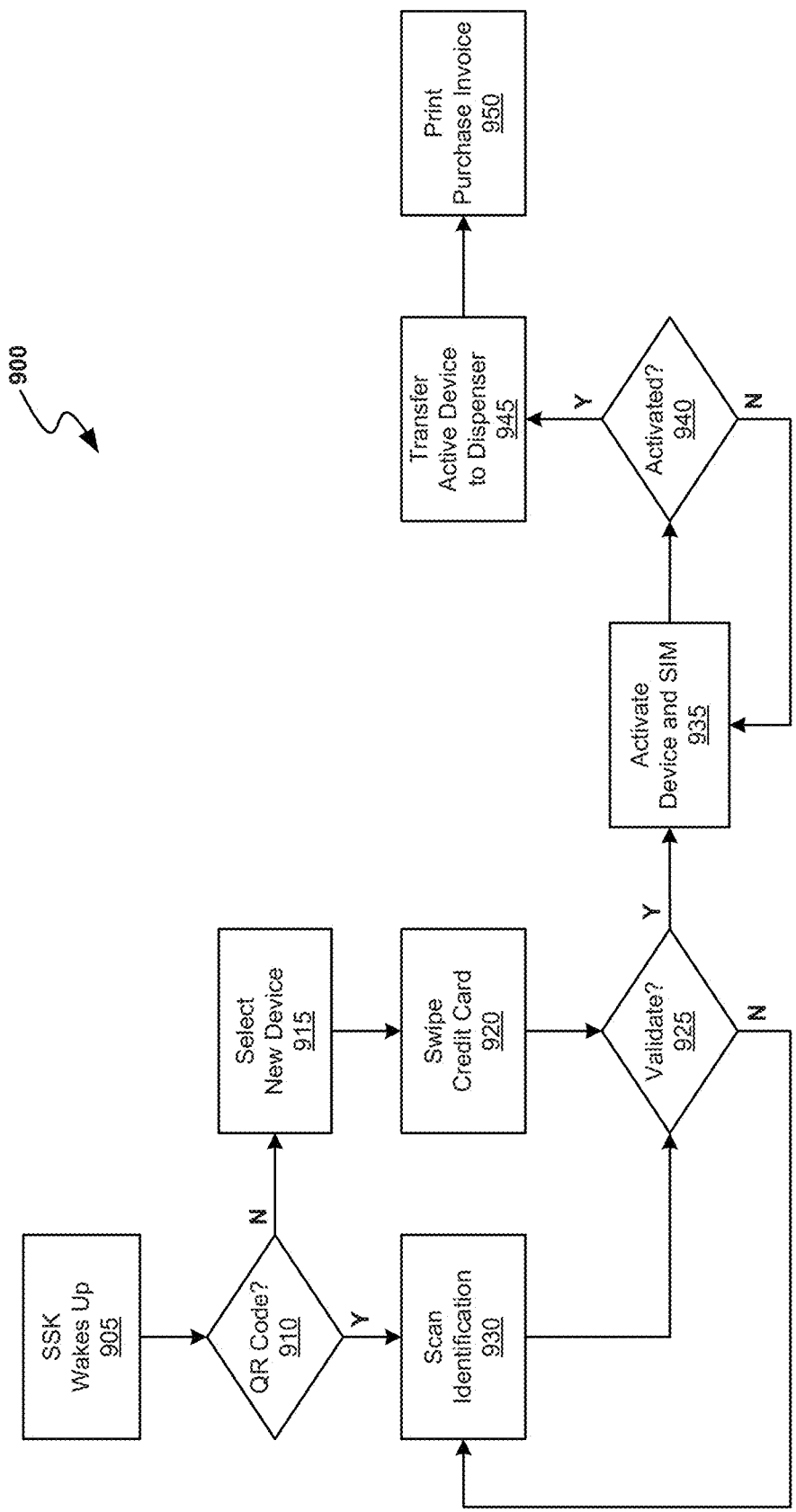
FIG. 9 is a flow diagram illustrating a method of handling a purchase transaction at a kiosk.

FIG. 7 is a process flow diagram illustrating a method of handling a transaction at a kiosk. FIG. 7 illustrates the different types of transactions that can be performed at a self-serve kiosk: rental transactions, purchase transactions, return transactions, etc. FIGS. 8 and 9 illustrate the sub-flows illustrated in FIG. 7. For example, FIG. 8 illustrates the sub-flow for rental transactions and return transactions. FIG. 9 illustrates the sub-flow for purchase transactions.

FIG. 8 illustrates the sub-flow for rental transactions and return transactions. Process 800 begins when a self-serve kiosk wakes up at step 805. A self-serve kiosk may wake up when a user interacts with it to initiate a transaction. In some embodiments, the self-serve kiosk may wake up when a user is in its proximity (e.g., when the user is within certain threshold distance from the self-serve kiosk). The user may also initiate a self-serve kiosk wakeup by touching its touchscreen, using the mobile device (e.g., by activating a link on the device), etc. When a self-serve kiosk wakes up at step 805, process 800 determines, at step 810, if the transaction type is a return transaction. For example, the user may select an option on the self-serve kiosk to identify that the user wants to return a previously borrowed device. Alternatively, if the user approaches the self-serve kiosk with a rented device, the SSK will by default automatically initiate a return transaction, unless intervened by the user.

If the transaction is a return transaction, the self-serve kiosk, at step 815, retrieves an empty bay number. The empty bay number may be based on the type of device being returned, availability of other bays, type of bay for type of device being returned (e.g. Android v. iOS device), etc. At step 820, the user may connect the device to a smart charger in the empty bay. In some embodiments, the user places the device in a common bay (receptacle) and the self-serve kiosk assigns the device to an empty bay by connecting it with an appropriate smart charger. The self-serve kiosk then analyzes the device at step 825 to identify any issues. For example, the self-serve kiosk may perform a visual scan of the device to determine if any portion of the device (e.g., the screen) is broken. The smart charge in the bay may analyze the device to diagnose any problems with the returned device. Once a device is analyzed, process 800, at step 830, resets the returned device to predetermined settings (e.g., factory settings, customized default settings, telecommunications service provider default settings, etc.). The device and its associated SIM may then be suspended at step 835. The self-serve kiosk then generates a receipt for the rental transaction at step 840. The receipt may be printed at the kiosk or sent to the user via electronic means (e.g., email, text, notification, etc.).

If the transaction is not a return transaction, process 800, at step 845, requests the user to provide an identification code (e.g., a QR code, PIN, password, barcode, facial recognition, fingerprint, etc.) which was provided during online rental confirmation. If an identification code is not provided, at step 850, process 800 requests the user to enter rental information. For example, the user may provide information such as the user information, authentication information, and/or rental information. The user may then be able to select a device to rent at step 855. For example, the user may be able to browse and/or the inventory of devices at the self-serve kiosk to identify a device to rent. In addition, payment information (e.g., credit card number, expiry date, cvv number, bank name, issuing authority, etc.) may be provided at step 860. For example, the user may swipe or scan a credit card at the self-serve kiosk to pay for the rental transaction. At step 865, the information provided by the user is validated. If the information is not validated, process 800 returns to step 860 and the user is prompted to provide the correct information. If the information is validated, at step 875, process 800 restores the selected device and activates the associated SIM. The device can then be disconnected from the smart charger by the user at step 880. An accessory package is then dispensed to the user at step 885. Process 800 then generates and transmits a receipt for the rental transaction at step 840.

On the other hand, if an identification code is provided at step 845, process 800 scans the identification information at step 870. The identification information is then validated at step 865. For example, process 800 can verify that the identification information provided matches a record in a database (e.g., a master database). If the identification information is not verified, process 800 returns to step 870 and the user is prompted to provide the correct identification information. If the information is validated, at step 875, process 800 restores the selected device and activates the associated SIM. The device is then disconnected from the smart charger at step 880. The device and an accessory package are then dispensed to the user at step 885. Process 800 then generates and transmits a receipt for the rental transaction at step 840.

FIG. 9 illustrates the sub-flow for purchase transactions. Process 900 begins when a self-serve kiosk wakes up at step 905. Process 900, at step 910, requests the user to provide an identification code (e.g., a QR code, PIN, password, barcode, facial recognition, fingerprint, etc.) which was provided during online purchase confirmation. If an identification code is not provided, at step 915, process 900 requests the user to select a new device for purchase. The user may be able to browse and/or the inventory of devices at the self-serve kiosk to identify a device for purchase. The user may view the statistics of various devices while making a selection. For example, the user may be presented with details such as model type, manufacturer, processor type, processor speed, memory, Bluetooth capabilities, speakers configuration, video streaming capabilities, etc. for available devices. The inventory of devices may comprise new devices, refurbished devices, second-hand devices, etc. Once a user selects a device for purchase, at step 920, process 900 receives payment information (e.g., credit card number, expiry date, cvv number, bank name, issuing authority, etc.). For example, the user may swipe or scan a credit card at the self-serve kiosk to pay for the rental transaction. At step 925, the information provided by the user is validated. If the information is not validated, process 900 returns to step 930 and the user is prompted to provide the correct information. If the information is validated, at step 935, process 900 activates the selected device and activates the associated SIM. Once it is verified that the device and/or SIM are activated at step 940, the device (and an accessory package) is dispensed to the user at step 945.

Process 900 then generates and transmits a receipt for the purchase transaction at step 950.

On the other hand, if an identification code is provided at step 910, process 900 scans the identification information at step 930. The identification information is then validated at step 925. For example, process 900 can verify that the identification information provided matches a record in a database (e.g., a master database). If the identification information is not verified, process 900 returns to step 930 and the user is prompted to provide the correct identification information. If the information is validated, at step 935, process 900 activates the selected device and activates the associated SIM. Once it is verified that the device and/or SIM are activated at step 940, the device (and an accessory package) is dispensed to the user at step 945. Process 900 then generates and transmits a receipt for the purchase transaction at step 950.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

We claim:

1. A self-serve retail system for providing mobile devices to users, the system comprising:
   at least one hardware processor coupled to a network; and
   at least one memory, coupled to the at least one processor, and carrying instructions to be executed by the at least one processor,
   a communications module coupled to the processor and to an external network;
   a power source coupled to the processor, memory and communications module;
   a kiosk housing for containing the hardware processor, memory, communications module and power source; and
   multiple mobile devices within bays or locations of the kiosk housing;
   a mechanism, under control of the processor, to provide a selected one of the multiple mobile devices;
   wherein the instructions stored with the memory are for:
     detecting that a user is within a threshold distance from the kiosk housing;
     upon detecting that the user is within the threshold distance from the kiosk housing, activating the kiosk housing to receive information from the user;
     receiving user authentication information and a request from the user for the selected one of the multiple mobile devices,
       wherein the request includes a unique identification code that identifies the selected one of the multiple mobile devices at the kiosk housing;
     upon authenticating the user based on the user authentication information:
       activating a SIM included the selected mobile device for use with a selected cellular network,
         wherein the activating includes providing a selected voice, data or voice and data plan associated with selected one of the multiple mobile devices for the user;
       providing instructions to the mechanism to provide to the user the selected one of the multiple mobile devices from the kiosk;
     periodically monitoring an inventory of the multiple mobile devices at the kiosk housing to determine a discount amount to offer for at least one of the multiple mobile devices; and
     sending periodic system status updates to a self-serve server.

2. The self-serve retail system of claim 1, wherein the mechanism is a robotic arm, and wherein at least one bay or at least one location of the kiosk includes wired or wireless charging capabilities for mobile devices.

3. The self-serve retail system of claim 1, further comprising:
   a diagnostic component, coupled to the processor, and configured to electronically inspect and assess a returned wireless mobile device;
   an optical scanner to receive and process a unique identification code provided to the user to access the requested mobile device from the kiosk; and
   visual and audio modules to provide instructions to the user.

4. The self-serve retail system of claim 1, wherein the unique identification code is one of:
   QR code,
   personal identification number,
   RFID code,
   password, or
   barcode.

5. The self-service retail system of claim 1, wherein the instructions are further for:
   managing the inventory of the multiple mobile device at the kiosk based on one or more purchasing trends identified by the self-service server using the periodic system status updates.

6. At least one computer-readable memory carrying instructions to be executed by at least one processor, wherein the instructions are performing a method for renting mobile devices and associated SIM cards by a user from a self-serve retail location, the method comprising:
   detecting that the user is within a threshold distance from the self-serve retail location;
   upon detecting that the user is within the threshold distance from the self-serve retail location, activating the self-serve retail location to receive information from the user;
   receiving user authentication information and a request for a mobile device at the self-serve retail location, wherein the request includes a unique identification code that identifies the requested mobile device at the self-serve retail location;
   receiving user identification information, wherein the user identification information identifies the user accessing the self-serve retail location;
   validating the unique identification code and the user identification information to determine that the user is authorized to retrieve the requested mobile device;
   when the user identification information is validated:
     determining a discount amount to offer to the user for the requested mobile device based at least on an inventory of mobile devices at the self-serve retail location;
     automatically activating the mobile device and activating a SIM included within the mobile device;
     transferring the activated mobile device with its included SIM to a dispenser at the self-serve retail location; and
     providing a confirmation receipt to the user comprising the determined discount amount,
       wherein the automatically activating includes providing voice or data service on a cellular network under a voice or data plan.

7. The at least one computer-readable memory of claim 6, wherein a transaction type of the request for retrieving the mobile device is one of:

rental,
purchase,
trade-in, or
trial run.

8. The at least one computer-readable memory of claim 6, wherein the user identification information comprises:
passport number,
government identification number,
credit card number,
driving license number,
biometric information (i.e. fingerprint), or any combination thereof.

9. The at least one computer-readable memory of claim 6, wherein the unique identification is received at an interface of the self-service retail location, and wherein the unique identification code is one of:
QR code,
personal identification number,
RFID code,
password, or
barcode.

10. The at least one computer-readable memory of claim 6, wherein when the user identification information is validated, the instructions further comprise:
disconnecting the activated mobile device from a charger prior to transferring the activated mobile device and SIM to the dispenser, and
when the user identification information is not validated:
transmitting an error message to the user, wherein the error message identifies one or more errors in the user identification information.

11. A computer-implemented method for renting mobile devices and associated SIM cards by a user from a self-serve retail location, the method comprising:
detecting that the user is within a threshold distance from the self-serve retail location;
upon detecting that the user is within the threshold distance from the self-serve retail location, activating the self-serve retail location to receive information from the user;
receiving user authentication information and a request for a mobile device at the self-serve retail location, wherein the request includes a unique identification code that identifies the requested mobile device at the self-serve retail location;
receiving user identification information, wherein the user identification information identifies the user accessing the self-serve retail location;
validating the unique identification code and the user identification information to determine that the user is authorized to retrieve the requested mobile device;
when the user identification information is validated:
determining a discount amount to offer to the user for the requested mobile device based at least on an inventory of mobile devices at the self-serve retail location;
automatically activating the mobile device and activating a SIM included within the mobile device;
transferring the activated mobile device with its included SIM to a dispenser at the self-serve retail location; and
providing a confirmation receipt to the user comprising the determined discount amount,
wherein the automatically activating includes providing voice or data service on a cellular network under a voice or data plan.

12. The method claim 11, wherein a transaction type of the request for retrieving the mobile device is one of:
rental,
purchase,
trade-in, or
trial run.

13. The method claim 11, wherein the user identification information comprises:
passport number,
government identification number,
credit card number,
driving license number,
biometric information (i.e. fingerprint), or any combination thereof.

14. The method claim 11, wherein the unique identification is received at an interface of the self-service retail location, and wherein the unique identification code is one of:
QR code,
personal identification number,
RFID code,
password, or
barcode.

15. The method claim 11, wherein when the user identification information is validated, the method further comprise:
disconnecting the activated mobile device from a charger prior to transferring the activated mobile device and SIM to the dispenser, and
when the user identification information is not validated:
transmitting an error message to the user, wherein the error message identifies one or more errors in the user identification information.

* * * * *